Figure 1:
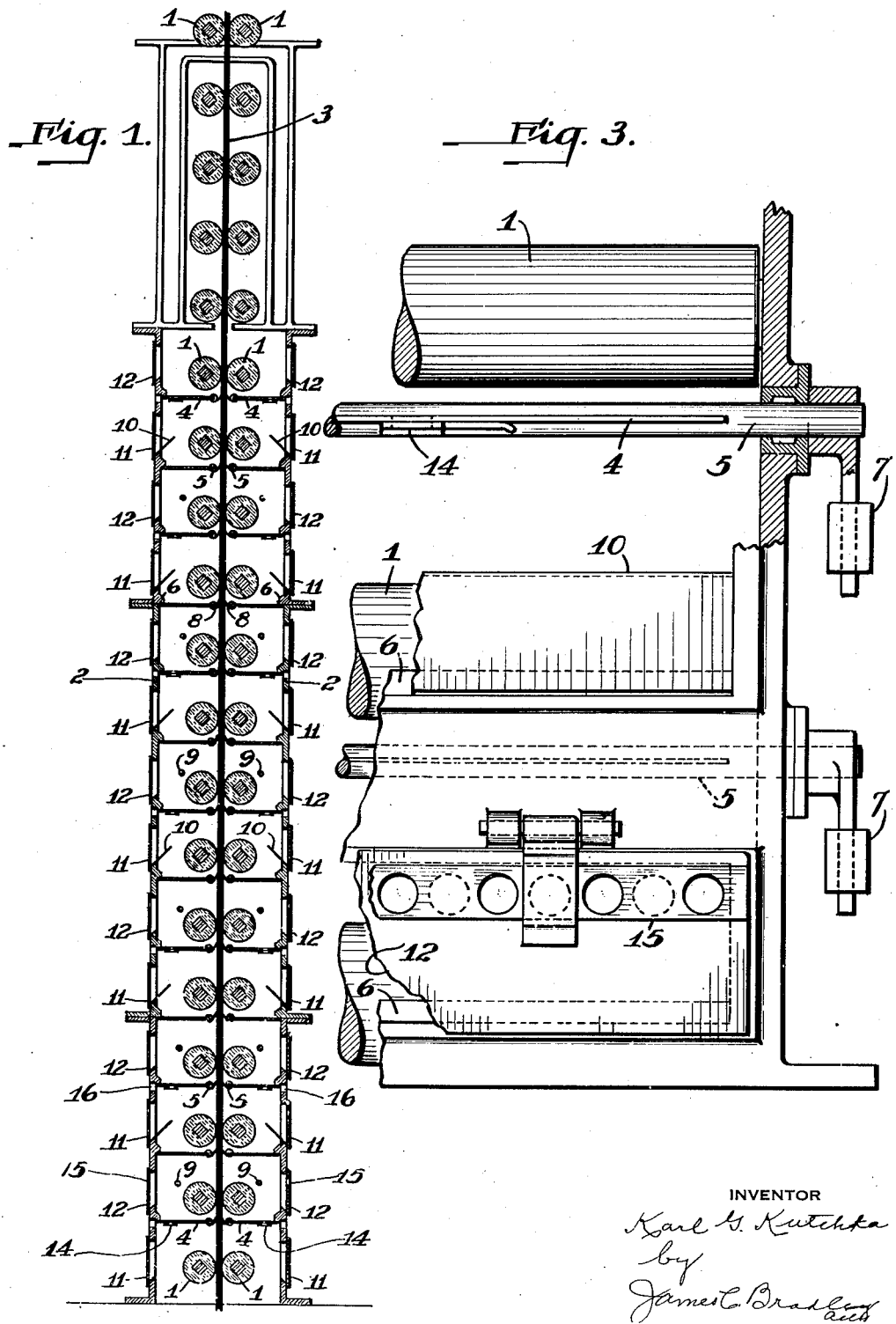

July 22, 1930. K. G. KUTCHKA 1,771,180
SHEET GLASS LEER
Filed March 21, 1929 2 Sheets-Sheet 2

INVENTOR
Karl J. Kutchka
by
James C. Bradley
Atty.

UNITED STATES PATENT OFFICE

KARL G. KUTCHKA, OF WILKINSBURG, PENNSYLVANIA, ASSIGNOR TO PITTSBURGH PLATE GLASS COMPANY, A CORPORATION OF PENNSYLVANIA

SHEET-GLASS LEER

Application filed March 21, 1929. Serial No. 348,783.

Figure 2:
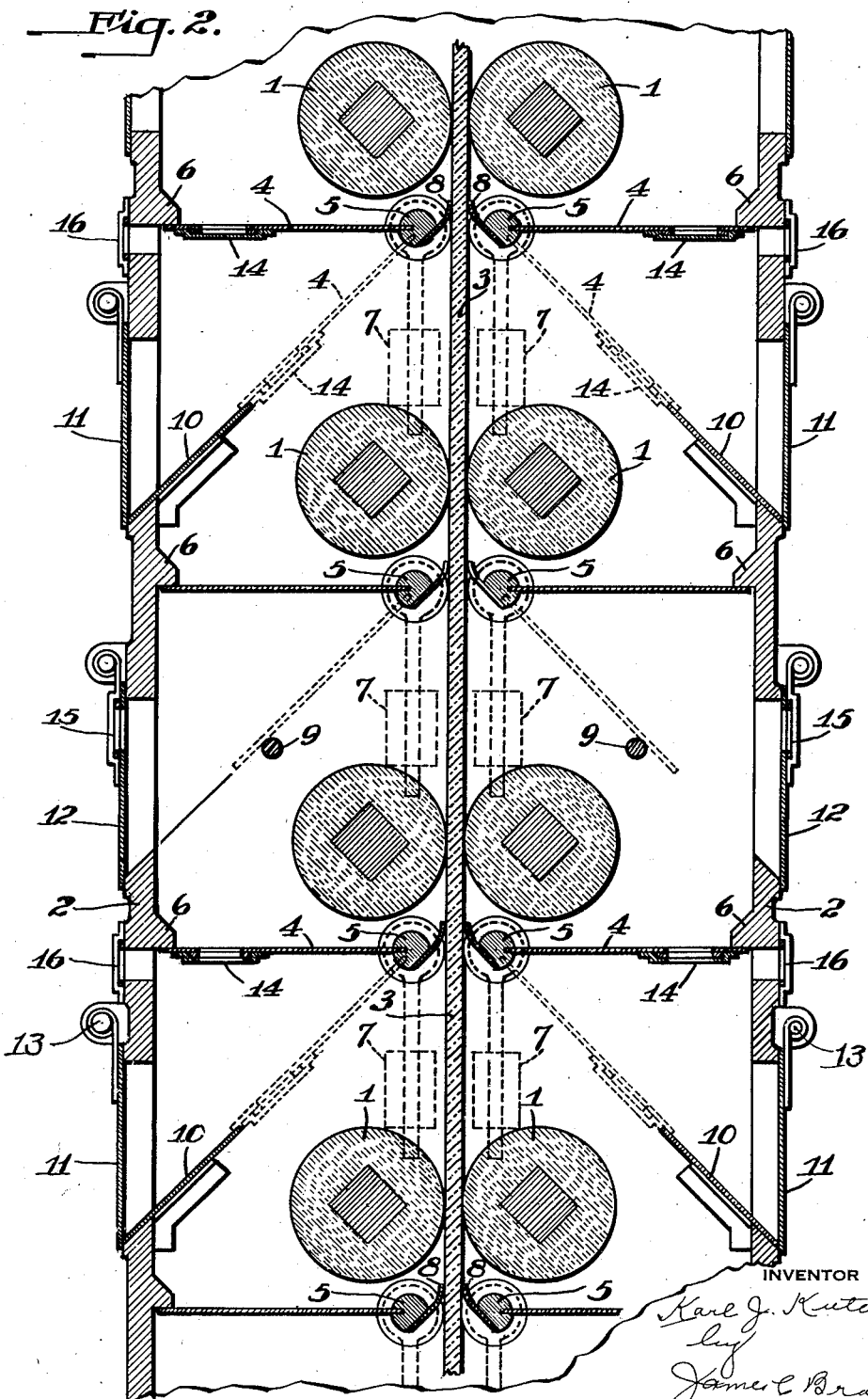

The invention relates to leers, and is particularly designed for service in the drawing of glass continuously in sheet form by the well known Slingluff or Fourcault processes, or modifications of such processes. In such processes, the leer is heated mainly or entirely by the heat from the body of glass in the bath beneath the leer and by the heat in the sheet being drawn. Leers of this type are made in sections and the heat supplied at the bottom circulated upward, being decreased in degree from the bottom to the top, so that the glass passing therethrough becomes gradually annealed and cooled. The glass may then be readily cut and handled, when it emerges from the top section of the leer. This leer apparatus, while simple in construction and operation, fails to give a close regulation of temperature conditions throughout the travel of the glass, and particularly through the critical annealing range of the glass, and a considerable part of the breakage which occurs in the leer, I believe to be due to this lack of close temperature control. The principal object of the present invention is the provision of means whereby the temperature in the sections of the leer may be more closely regulated than has heretofore been done, so that the upwardly moving sheet is exposed to temperatures which decrease very gradually and uniformly, thus reducing the amount of breakage. A further object of the invention is the provision of means whereby any glass broken in the improved leer and which falls back is directed away from the sheet being formed and removed. One embodiment of the invention is shown in the accompanying drawings, wherein:

Figure 1 is a vertical section through a leer built in accordance with the invention. Fig. 2 is a similar partial section on an enlarged scale. And Fig. 3 is a partial side elevation.

Referring to the drawings, 1, 1, etc. are pairs of driven rolls mounted in the leer casing 2 and adapted to grip between them the glass sheet 3 which is drawn upward continuously from a molten bath beneath, which is not shown. Each pair of rolls lies in a separate compartment closed at its upper and lower ends by the pairs of plates 4, 4. These plates are secured at their inner edges to the shafts 5, 5 mounted for oscillation and normally held in horizontal position (with their outer edges in contact with the stop shoulders 6, 6) by means of the weighted arms 7, 7 secured to the ends of the shafts 5, 5 outside the casing, as indicated in Fig. 3. The shafts are provided with strips of asbestos 8, 8, which engage the sides of the glass sheet when the plates are in horizontal position, and thus provide a seal against the passage of air from one compartment to the next. When the plates swing down to the inclined positions indicated in Fig. 2, the strips engage the peripheries of the rolls above and still provide a seal.

A part of the plates are limited in their downward swinging movement by stop rods 9, 9, while in other cases inclined plates 10, 10, carried by the casing, act as stop means. Each compartment is provided with a pair of doors 11, 11 and 12, 12 hinged at 13, 13. The doors 11, 11 provide for the removal of any broken glass which may fall on the plates 4, 4 and 10, 10 and slide down into the angular space between the plates 10, 10 and the doors 11, 11. This swinging movement of the plates 4, 4 occurs only when a sufficient weight of glass accumulates on them, and when this glass is removed through the doors 11, 11, the plates swing back to horizontal position. In order to reduce the number of points at which broken glass is removed from the casing, a part only of the compartments are provided with the plates 10, 10. In the other compartments the plates 4, 4 are stopped by the rods 9, 9, and any glass which has accumulated above these plates drops down through the compartment below when the plates swing down and engage the stop rods, after which the plates swing back to horizontal position.

Each of the plates 4, 4 is provided with a damper 14 preferably of the sliding type by means of which the flow of air from one compartment to the next is controlled. This constitutes one of the means available in this apparatus for regulating the temperature of the compartments, the opening of a damper serving to reduce the temperature of the lower of the two compartments and to increase that of the one above. A second means for regulating temperature consists of the slide dampers 15 and 16 which govern openings through the doors 12 and the casing 1, the damper 16 being used with those compartments which are not provided with dampers in the doors. By the use of these dampers any one of them may be reduced in temperature at will by increasing the amount of damper opening. Since there is substantially no leakage between the various compartments, the temperatures of such compartments may be accurately graded and controlled by the use of the two sets of dampers and conditions of temperature change in the sheet adjusted so as to give an annealing condition in the sheet best suited to avoid breakage and bring the sheet to a condition suitable for cutting and handling in the relatively short distance available in a leer of the vertical type. The advantage in temperature control, as compared with leers of this general type heretofore used will be readily apparent to those skilled in the art.

What I claim is:

1. In combination in a leer for annealing a glass sheet drawn continuously from a molten bath, a vertical leer casing, a series of partitions at spaced intervals one above the other dividing the casing into a plurality of compartments, and a series of pairs of rolls extending through the casing for drawing the glass sheet therethrough, the side walls of the various sections having openings therethrough provided with dampers, and a plurality of said partitions also having openings therethrough provided with dampers.

2. In combination in a leer for annealing a glass sheet drawn continuously from a molten bath, a vertical leer casing, a series of substantially horizontal partitions at spaced intervals one above the other dividing the casing into a plurality of compartments, and a series of pairs of rolls extending through the casing for drawing the glass sheet therethrough, the side walls of the various sections having openings therethrough provided with dampers, and a plurality of said partitions also having openings therethrough provided with dampers.

3. In combination in a leer for annealing a glass sheet drawn continuously from a molten bath, a vertical leer casing, a series of partitions at spaced intervals one above the other dividing the casing into a plurality of compartments and each having a flexible edge adapted to yieldingly engage the opposite sides of the glass sheet, and a series of pairs of rollers extending through the casing for drawing the glass sheet therethrough, the side walls of the various sections having openings therethrough provided with dampers, and a plurality of said partitions also having openings therethrough provided with dampers.

4. In combination in a leer for annealing a glass sheet drawn continuously from a molten bath, a vertical leer casing, a series of partitions at spaced intervals one above the other dividing the casing into a plurality of compartments and each comprising a pair of horizontal plates each of which is hinged adjacent the center of the leer so that it can swing down to an inclined position, means for maintaining the plates yieldingly in horizontal position, doors carried by the side walls of a part of the compartments, plates in such last compartments projecting inwardly and upwardly from the side walls thereof below the doors, and of such width as to be engaged by said first plates when they swing down, and a series of pairs of rolls extending through the casing for drawing a glass sheet continuously upward therethrough.

5. In combination in a leer for annealing a glass sheet drawn continuously from a molten bath, a vertical leer casing, a series of partitions at spaced intervals one above the other dividing the casing into a plurality of compartments and each comprising a pair of horizontal plates each of which is hinged adjacent the center of the leer so that it can swing down to an inclined position, means for maintaining the plates yieldingly in horizontal position, doors carried by the side walls of a part of the compartments, plates in such last compartments projecting inwardly and upwardly from the side walls thereof below the doors, and of such width as to be engaged by said first plates when they swing down, and a series of pairs of rolls extending through the casing for drawing a glass sheet continuously upward therethrough, said swinging plates each having a flexible edge adapted to engage the sheet of glass when the plate is in horizontal position, and adapted to engage the periphery of one of said rolls when the plate is swung down to inclined position.

6. In combination in a leer for annealing a glass sheet drawn continuously from a molten bath, a vertical leer casing, a series of partitions at spaced intervals one above the other dividing the casing into a plurality of compartments and each comprising a pair of horizontal plates each of which is hinged adjacent the center of the leer so that it can swing down to an inclined position, means for maintaining the plates yieldingly in horizontal position, doors carried by the side walls of a part of the compartments, plates in such last compartments projecting inwardly and upwardly from the side walls thereof below the doors, and of such width as to be engaged by said first plates when they swing down, means permitting a controlled flow of air from each compartment to the atmosphere, and a series of pairs of rolls extending through the casing for drawing a glass sheet upward therethrough, a plurality of said partitions having openings therethrough provided with dampers.

In testimony whereof, I have hereunto subscribed my name this 16th day of March, 1929.

KARL G. KUTCHKA.